US007375612B2

(12) United States Patent
Murray et al.

(10) Patent No.: US 7,375,612 B2
(45) Date of Patent: May 20, 2008

(54) SYSTEMS AND RELATED METHODS FOR LEARNING A RADIO CONTROL TRANSMITTER TO AN OPERATOR

(75) Inventors: James S. Murray, Milton, FL (US); Yan Rodriguez, Canton, OH (US)

(73) Assignee: Wayne-Dalton Corp., Mt. Hope, OH (US)

( * ) Notice: Subject to any disclaimer, the term of this patent is extended or adjusted under 35 U.S.C. 154(b) by 897 days.

(21) Appl. No.: 10/265,833

(22) Filed: Oct. 7, 2002

(65) Prior Publication Data

US 2004/0066277 A1 Apr. 8, 2004

(51) Int. Cl.

| | |
|---|---|
| ***G05B 19/00*** | (2006.01) |
| ***G06F 7/00*** | (2006.01) |
| ***G08B 29/00*** | (2006.01) |
| ***H04B 1/00*** | (2006.01) |
| ***H04Q 1/00*** | (2006.01) |

(52) U.S. Cl. .................... 340/5.54; 340/5.71; 340/5.23

(58) Field of Classification Search ...... 340/5.23–5.24, 340/5.7, 5.71–5.72, 825.69, 825, 5.54; 714/4–8; 318/268, 468, 459, 484, 565
See application file for complete search history.

(56) References Cited

U.S. PATENT DOCUMENTS

| | | | | |
|---|---|---|---|---|
| 4,228,424 | A | 10/1980 | Le Nay et al. | 340/506 |
| 4,529,980 | A | 7/1985 | Liotine et al. | 340/825.52 |
| 4,750,118 | A | 6/1988 | Heitschel et al. | 364/400 |
| 4,754,255 | A * | 6/1988 | Sanders et al. | 340/5.54 |
| 4,772,876 | A | 9/1988 | Laud | 340/539 |
| 4,847,542 | A | 7/1989 | Clark et al. | 318/560 |
| 4,855,713 | A | 8/1989 | Brunius | 340/506 |
| 4,881,148 | A | 11/1989 | Lambropoulos et al. | 361/172 |
| 4,912,463 | A | 3/1990 | Li | 340/825.69 |
| 5,077,547 | A | 12/1991 | Burgmann | 340/50.1 |

(Continued)

*Primary Examiner*—Brian Zimmerman
*Assistant Examiner*—Nam Nguyen
(74) *Attorney, Agent, or Firm*—Renner Kenner Greive Bobak Taylor & Weber

(57) ABSTRACT

A door operator and related methodologies for learning new transmitter codes include a motor for moving the moveable barrier between two travel limit positions, an operator for controlling operations of the motor and a remote transmitter. The operator includes temporary and permanent memory devices to assist in learning new transmitter codes as needed. In one embodiment, the operator learns a new transmitter code by receiving signals from the remote transmitter after a storage button is depressed. In another embodiment, the operator learns a new transmitter code by periodically alternating between receipt of low range and high range radio frequency signals. In a similar embodiment, actuation of a transmitter button emits an infrared signal for programming the operator and a radio frequency signal for enabling the motor. In yet another embodiment, the transmitter is electrically connected to a port connector that is directly connected to the operator and whereupon actuation of the transmitter transfers the coded signals directly to a controller for learning thereof. Alternatively, insertion of the transmitter into the port may force the controller to generate and send a code to the transmitter. Accordingly, when the transmitter is removed from the port, actuation of a button causes the operator to initiate the appropriate function. In another embodiment, insertion of an indicia-carrying key into the operator could be used to program the operator. Or, actuating the buttons on the transmitter in a predetermined sequence could be used to program the transmitter with the controller.

18 Claims, 9 Drawing Sheets

U.S. PATENT DOCUMENTS

| | | | | |
|---|---|---|---|---|
| 5,148,159 | A * | 9/1992 | Clark et al. | 340/825.69 |
| 5,252,966 | A * | 10/1993 | Lambropoulos et al. | 340/5.64 |
| 5,291,193 | A | 3/1994 | Isobe et al. | 340/825.69 |
| 5,408,217 | A | 4/1995 | Sanderford, Jr. | 340/506 |
| 5,473,318 | A | 12/1995 | Martel | 340/825.31 |
| RE35,364 | E | 10/1996 | Heitschel et al. | 364/400 |
| 5,635,913 | A | 6/1997 | Willmott et al. | 340/825.22 |
| 5,751,224 | A | 5/1998 | Fitzgibbon | 340/825.22 |
| 5,781,143 | A | 7/1998 | Rossin | 341/173 |
| 5,854,593 | A | 12/1998 | Dykema et al. | 340/825.22 |
| 5,940,000 | A * | 8/1999 | Dykema | 340/825.22 |
| 5,969,637 | A | 10/1999 | Doppelt et al. | 340/825.69 |
| 6,037,727 | A | 3/2000 | Kawanobe et al. | 318/286 |
| 6,049,289 | A | 4/2000 | Waggamon et al. | 340/825.31 |
| RE36,703 | E | 5/2000 | Heitschel et al. | 700/90 |
| 6,081,203 | A | 6/2000 | Fitzgibbon | 340/825.72 |
| 6,101,428 | A * | 8/2000 | Snyder | 701/2 |
| 6,181,255 | B1 | 1/2001 | Crimmins et al. | 340/825.69 |
| 6,271,745 | B1 * | 8/2001 | Anzai et al. | 340/5.53 |
| 6,278,249 | B1 | 8/2001 | Fitzgibbon et al. | 318/268 |
| 6,326,754 | B1 | 12/2001 | Mullet et al. | 318/480 |
| 6,439,009 | B1 | 8/2002 | Heese et al. | 70/92 |
| 6,549,117 | B1 * | 4/2003 | Kato et al. | 340/5.72 |
| 6,588,153 | B1 | 7/2003 | Kowalczyk | 49/380 |
| 6,667,684 | B1 * | 12/2003 | Waggamon et al. | 340/5.71 |
| 6,703,962 | B1 | 3/2004 | Marics et al. | 341/176 |
| 6,744,231 | B2 * | 6/2004 | Fitzgibbon et al. | 318/286 |
| 6,756,895 | B2 * | 6/2004 | Study et al. | 340/825.69 |
| 2002/0067826 | A1 | 6/2002 | King | 380/28 |
| 2003/0016139 | A1 * | 1/2003 | Teich | 340/5.71 |
| 2003/0033540 | A1 | 2/2003 | Fitzgibbon | 713/200 |
| 2004/0222913 | A1 | 11/2004 | Olmsted et al. | 341/176 |

* cited by examiner

FIG−3

SYSTEMS AND RELATED METHODS FOR LEARNING A RADIO CONTROL TRANSMITTER TO AN OPERATOR

TECHNICAL FIELD

Generally, the present invention relates to a garage door operator system for use on a closure member moveable relative to a fixed member. More particularly, the present invention relates to an operator-controlled motor for controlling the operation of a closure member, such as a gate or door, between a closed position and an open position. More specifically, the present invention relates to an operator-controlled motor for a door or gate operator, which allows for simplified methods of learning transmitters to a receiver that controls the operator.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired or wireless wall station or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. As is well documented in the art, the remote devices and operators may be provided with codes that change after every actuation of the remote device so as to make it virtually impossible to "steal" a code and use at a later time for illegal purposes.

In order for a remote controlled device to work with an operator to control movement of the garage door, the operator must be programmed to learn the particular code for each transmitter. In the past, radio controls utilized a code setable switch, such as a ten- circuit dual in-line parallel (DIP) switch to set the data for both the transmitter and the receiver. Both the transmitter and the receiver's code switch would have to match for the transmitter to activate the receiver's output. This method did not allow for enough unique codes and was relatively easy for someone to copy the code and gain improper access. In summary, this process requires the setting of transmitter and receiver codes physically switched to identical settings for operation of the garage door.

Presently, most radio controls for garage doors use either a fixed code format wherein the same data for each transmission is sent, or a rolling-code format, wherein some or all of the data changes for each transmission. Data for each transmitter transmission is stored in non-volatile memory in the transmitter and is learned by the receiver during a learning process. The most common learning process is to put the receiver in a "learn" mode by momentarily pressing a push-button switch on the receiver. The receiver indicates that it is in a learning mode and awaits a transmitter transmission. Once a transmission is received from the remote control that is to be associated with the operator and once the code is validated, the transmitter data is stored in the receiver's non-volatile memory. The receiver then automatically returns to its normal mode of operation. During the receiver's normal mode of operation, subsequent received transmissions are compared with the stored data and if a match is found, an appropriate garage door function is activated. In summary, the learning process entails enabling the receiver's learn mode, activating the transmitter, validating and storing the data by the receiver and then returning the receiver to a normal mode.

Although the aforementioned methods and devices are sufficient for their stated purpose, they are subject to problems. For example, the transmission of the codes can be interrupted such that an improper code is learned during the learning process. This would then require repeating the process as needed. Therefore, there is a need for operators that provide more secure methods of learning transmitters.

DISCLOSURE OF INVENTION

It is thus an object of the present invention to provide a system and method for learning a radio control transmitter to a motorized door operator. A moveable barrier, which is commonly referred to as a door or gate, is of the type that is moveable into an out-of-proximity position with a fixed surface that is to be sealed relative to the door. The door or gate is coupled to the motorized operator which controls movement of the door or gate.

It is a further object of the present invention, as set forth above, to provide a mechanism such as counter-balance springs coupled to the motor and the operator to assist in moving the barrier in a desired direction. It is yet another object of the present invention, as set forth above, to provide an up/down switch that generates control signals that are received by the operator. The up/down switch may be actuated by a hard-wired control button, a main remote control button, an alpha-numeric keypad, or the like.

It is an additional object of the present invention, as set forth above, to provide the operator with an operator controller that contains the necessary memory, hardware, and software for learning remote transmitter codes and software routines for validating and storing the codes. It is yet another object of the present invention, as set forth above, to provide the memory in any form of a memory storage device and preferably in the form of electrically erasable, programmable non-volatile ROM for temporarily and then permanently storing codes emitted from the remote transmitter. It is yet a further object of the present invention, as set forth above, to provide a permanently stored password in the permanent memory, wherein the password is permanently associated with the operator.

It is an additional object of the present invention, as set forth above, to provide a transmitter device that is operable with the operator and wherein the transmitter device is capable of communicating with the operator either via a hard-wire connection or remotely. It is yet another object of the present invention, as set forth above, to provide the transmitter device with a transmitter controller that contains the necessary memory, hardware, and software for generating remote transmitter codes and software routines for validating, storing, and generating a new remote transmitter code that is capable of being learned by the operator. It is yet a further object of the present invention, as set forth above, to provide multiple function buttons associated with the transmitter controller for generating function-specific commands that are received by the operator. It is still a further object of the present invention to provide a radio frequency emitter (RF) and/or infrared emitter that is operably connected to the transmitter controller. And, it is a further object of the present invention, as set forth above, to provide a permanent memory device such as an electrically erasable, programmable read only memory (EEPROM) that is in electrical communication with the transmitter controller.

It is yet another object of the present invention is to provide a housing that carries the operator and related processor based control systems for controlling the motor and related features of the garage door operator. Another object of the present invention, as set forth above, is to provide a receiver that extends from the housing to receive RF or infrared signals from the remote transmitters and to transfer these signals to the operator controller for conversion to a necessary format for testing and validation. Still another object of the present invention is to provide the housing with a connection port that receives and electrically engages the remote transmitter by way of an electrical interface. Yet another object of the present invention is to provide the housing, as set forth above, with a storage button or switch that is electrically connected to the operator controller for learning the transmitter codes. Still yet another object of the present invention is to provide the housing with a key port that receives and electrically engages a key specifically associated with a transmitter to be learned by the operator. Another object of the present invention is to provide the operator with features to receive input and generate output for controlling the features related to the operator controller such as overhead lights, safety sensors and related devices.

It is still another object of the present invention to provide the operator with an infrared receiver that is capable of receiving infrared emitted signals from the transmitter. It is still a further object of the present invention to provide the infrared receiver with a shielding feature such that only short range signals can be received by the infrared receiver. It is still yet a further object of the present invention to provide the operator with a key port for the purpose of receiving a key that is specifically associated with a remote transmitter device.

It is yet a further object of the present invention to provide a key device that is shipped with each transmitter from a controlled distribution point. Each key is specifically associated with the transmitter inasmuch as a code associated with the key is provided in the permanent memory of the transmitter controller. It is yet a further object of the present invention to provide the key with a binary code that is readable by the key port. It is still a further object of the present invention to provide the binary code in the form of a magnetic, optical or hologram format for receipt by the key port.

It is still a further object of the present invention to provide the operator with methods of learning a new transmitter code that enables the operator to open and close movable barriers as needed. Accordingly, it is another object of the present invention to provide an operator and associated method of learning a transmitter code wherein the transmitter is first actuated and its' code is received in the operator controller, whereupon the store button is actuated to load the code held in a temporary memory location into a permanent memory location such that subsequent actuations of the remote transmitter activate the operator for moving the door between positions.

It is yet another object of the present invention to provide an operator and an associated method wherein the operator controller alternatingly monitors for high and low range distance signals that may be transmitted by a transmitter, wherein the low range distance signal is utilized to send a transmitter code for learning by the operator controller and wherein the high range distance signal is received by the operator for initiating the requested activity.

It is yet another object of the present invention to provide an operator and an associated method wherein the remote transmitter is directly connected to the operator by the connection port to directly transmit the transmitter code to be learned to the operator's permanent memory.

It is yet another object of the present invention to provide an operator and an associated method wherein the remote transmitter is initially provided without a transmitter code and wherein the remote transmitter is directly connected to the operator by the connection port where the operator senses the presence of the remote transmitter and automatically generates a transmitter code which is stored in the memory of the transmitter controller whereupon removal of the remote transmitter device allows for its use with the operator.

It is still yet another object of the present invention to provide an operator and an associated method wherein the remote transmitter emits an infrared signal that is detected by the controller of the operator, which if valid, is stored in the operator's permanent memory to allow for use of a radio frequency signal that is emitted from the same transmitter with that specific operator.

It is still a further object of the present invention to provide an operator and an associated method wherein the operator's controller is factory programmed with a password which can be emitted from the remote transmitter by a predetermined actuation of the remote transmitter's actuation buttons so as to permanently associate the remote transmitter with the operator.

It is still yet another object of the present invention to provide an operator and an associated method wherein the binary key associated with a remote transmitter is inserted into the key port of the operator, whereupon the operator controller learns the binary key so as to allow the remote transmitter associated with that key to be used with the operator.

In general, the present invention contemplates a door operator and method for teaching a code to the operator that enables an actuation of the motor to move a barrier between limit positions wherein the operator receives a transmitted code in a temporary memory maintained by the operator. A storage switch is provided on the operator and when actuated it transfers the transmitted code from the temporary memory to a permanent memory device so that the remote transmitter can be used with that particular operator. The invention further contemplates the operator comparing the transmitted code received in the temporary memory with codes previously stored in the permanent memory and energizing the motor if the received code stored in the temporary memory matches one of the codes stored in the permanent memory. The operator may also hold the transmitted code in the temporary memory until either a new code is received or the storage switch is activated.

The invention also contemplates a door operator and method for teaching a code to an operator that enables actuation of a motor to move a barrier between limit positions wherein the operator receives a transmitted short distance signal having a learned code that is temporarily stored in a memory device maintained by the operator and wherein the operator permanently stores the learned code in the memory device if the learned code does not match any other codes in the memory device. The invention also contemplates checking the learned code for compatibility with the operator prior to the permanent storing of the learned code. The invention also contemplates receiving a transmitted long distance signal having an action code wherein the operator performs the action code if the action code matches with any learned code in the memory device. The operator is never placed in a "learn" mode by virtue of the operator periodically repeating both steps of receiving a transmitted short distance signal and a transmitted long distance signal.

The invention further contemplates an operator and related method for learning a code to an operator to enable actuation of the motor to move a barrier between positions wherein the operator is carried by a housing and the housing includes a port connector and wherein a remote transmitter is electrically connected to the port connector. The remote transmitter has a button that when actuated electrically transmits a coded signal that is stored into a memory device maintained by the operator. The method also contemplates that the remote transmitter button must be closed for a predetermined period of time so that the coded signal is received a predetermined number of times before the code is stored in a permanent memory location maintained by the operator.

The invention further contemplates an operator and related method for learning an operator to a transmitter. The operator is connected to a motor that moves a movable barrier between travel limit positions. A housing carries an operator and provides a port connector. The operator controls operation of the motor upon receipt of a code and the operator is electrically connected to the port connector. The operator has a memory device with a key code stored therein. The invention also contemplates that at least one remote transmitter is electrically connectable to the port connector, wherein the remote transmitter has a transmitter controller with a transmitter memory and a button that when actuated transmits the code.

The invention further contemplates that if the remote transmitter is electrically connected to the port connector the operator will generate a new code based upon the key code and transfers this new code to the transmitter memory. Accordingly, when the remote transmitter is removed from the connector port and the button is actuated, the new code is transmitted to the operator which initiates movement of the motor.

The invention also contemplates an operator and related method for learning a new code to an operator wherein the operator controls a motor for moving the movable barrier between travel limit positions. The operator controls operation of the motor and the operator is capable of receiving a first type of signal and a second type of second, and wherein the operator has a memory device capable of storing a signal code. The invention also contemplates that at least one transmitter emits both first and second types of signals and which may either be infrared or radio frequency type signals and wherein both signals include the signal code. Accordingly, if one of the signals is in a valid format, the signal code is stored in the memory device to enable operation of the motor upon receipt of later transmissions.

The invention also contemplates an operator for movable barrier which incorporates a motor for moving the barrier between limit positions. The operator controls operation of the motor and the operator has a memory device. The invention also contemplates that password indicia is associated with the operator and a transmitter having at least two transmission buttons which when actuated emits a signal receivable by the operator. Accordingly, the invention contemplates that actuation of at least two transmission buttons in a predetermined sequence suggested by the password indicia causes the transmitter to emit a signal that is then matched by the operator with the password code stored in the memory device and wherein the sequence of signals must be matched by the operator to the password code to enable the operator to store the code in permanent memory.

The invention further contemplates an operator and related method for learning a code to an operator with a motor that moves the movable barrier between limit positions. The operator controls operation of the motor and the operator is capable of receiving a coded signal for energizing the motor and the operator has at least one memory device. The invention also contemplates that a housing carries the operator and that the housing has a key port. The invention also contemplates that a key, having a key code, is receivable in the key port. The operator detects the presence of the key and stores the key code in the at least one memory device. The invention also contemplates that at least one transmitter has at least one button that transmits the coded signal when actuated. If the transmittal coded signal matches the code of the inserted key the operator permanently learns that key code and energizes the motor. The transmitter may then be used with or without the key in the key port. The key code may be in form of a magnetic strip, an optical character recognition symbol or a holographic figure.

These and other objects of the present invention, as well as the advantages thereof over existing prior art forms which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
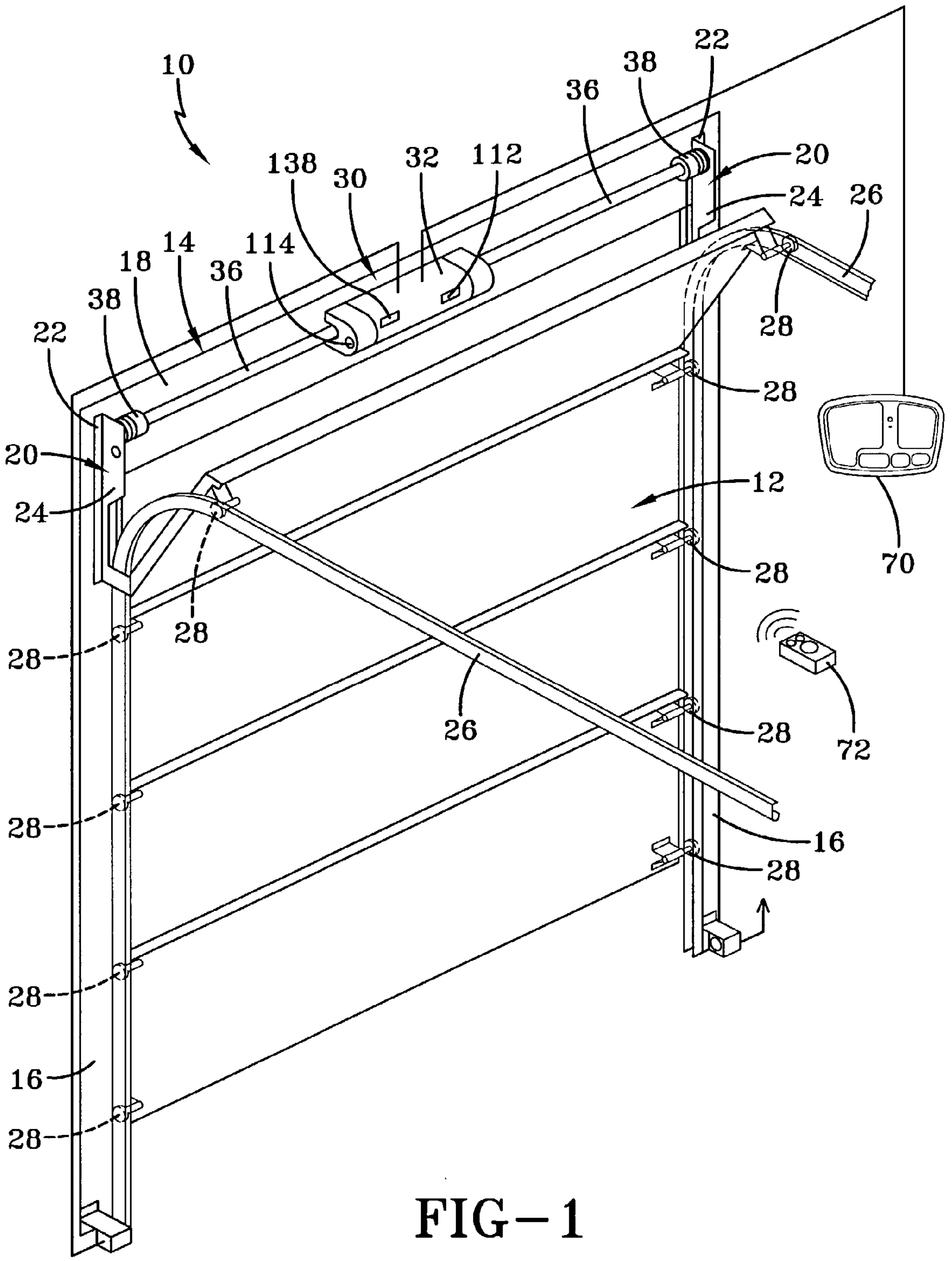
FIG. 1 is a perspective view depicting a sectional garage door and showing an operating mechanism embodying the concepts of the present invention.

A system and related methods for setting custom door travel limits on a motorized garage door operator is generally indicated by the numeral 10 in FIG. 1 of the drawings. The system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes a housing 32, which is affixed to the header 18 which contains an operator mechanism. Extending through the operator housing 32 is a drive shaft 36, the opposite ends of which carry cable drums 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with other types of movable barriers. For example, the control routines can be easily incorporated into trolley type operators used to move garage doors.

The drive shaft 36 transmits the necessary mechanical power to transfer the garage door 12 between closed and open positions. In the housing 32, the drive shaft 36 is coupled to a drive gear at about a midpoint thereof wherein the drive gear is coupled to a motor in a manner well known in the art. Energization of the motor may be initiated by a wall station transmitter 70 or by a remote or portable transmitter 72.

Figure 2:
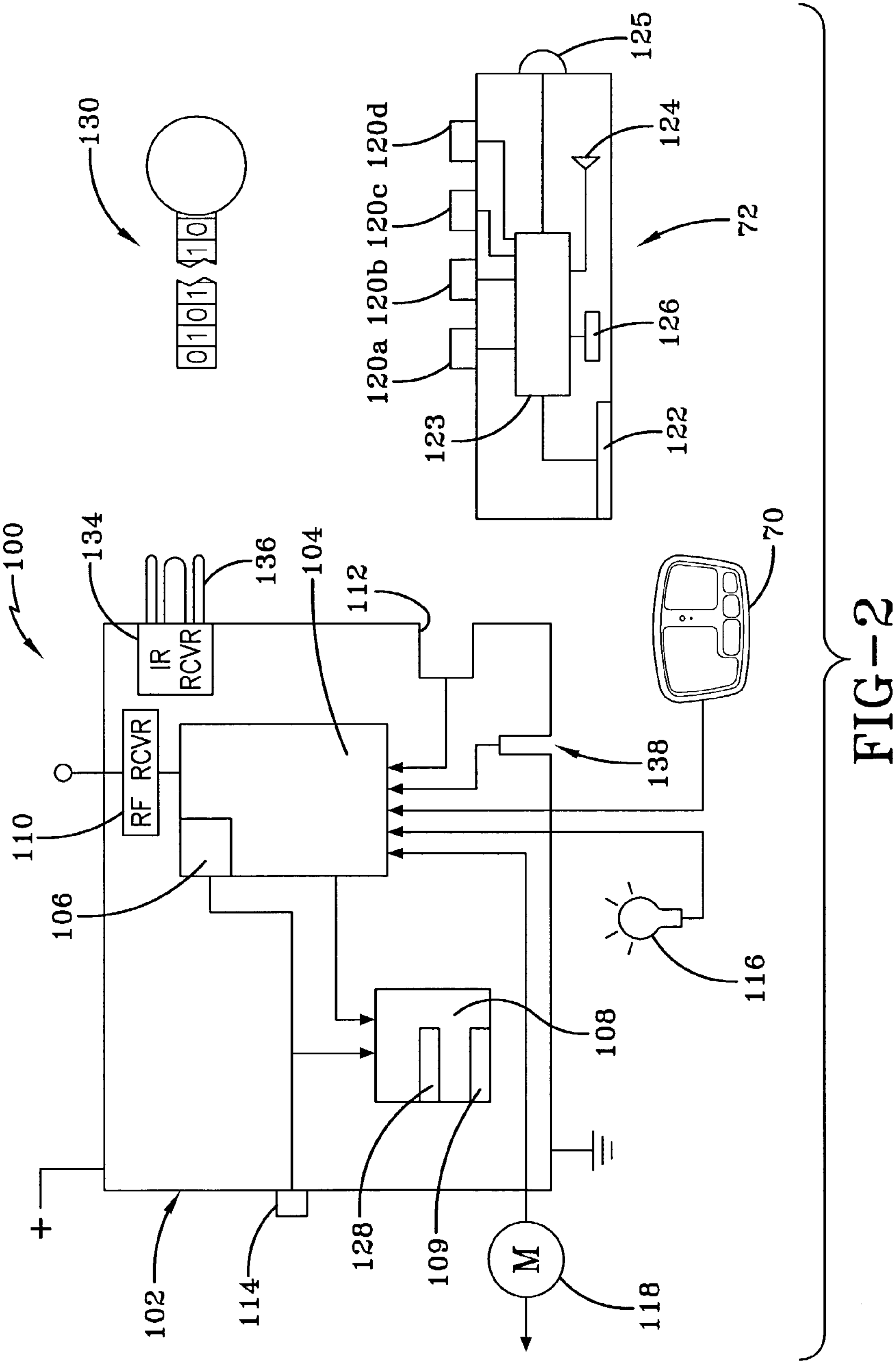
FIG. 2 is a schematic drawing of control circuits embodied in the operator and a transmitter according to the present invention.

An operator mechanism, which is designated generally by the numeral 100 in FIG. 2 is contained within the housing 32, and monitors operation of the motor and various other components connected to the operator as will be described hereinbelow. A power source is used to energize the foregoing elements. The operator 100 includes a control circuit 102 which is carried by the housing 32. The control circuit 102 includes a controller 104 which carries the necessary hardware, software, and memory devices for implementing operator functions and the routines for learning and storing a new transmitter code. In particular, the controller 104 includes a temporary memory device 106 and a permanent memory device 108.

Electrically connected to the controller 104 is a radio receiver 110 which is capable of receiving a radio frequency signal from the transmitter 72. Alternatively, the receiver 110 may be replaced by an infrared receiver for receiving an infrared signal, or some other wireless type device. In any event, the controller 104 receives the signal received by the receiver 110 and in conjunction with programming contained therein converts the received signal into a useable format by the controller 104. The control circuit 102 may include a port 112 —accessible through an opening in the housing —that electrically receives a remote transmitter.

A store button 114 is provided on the housing and is electrically connected to the control circuit 102 for the purpose of transferring transmitted signal data from the temporary memory device 106 to the permanent memory device 108. The control circuit 102 may also provide a direct connection to an overhead light 116 that is energized whenever the controller 104 receives an appropriate signal from the remote transmitter 72 or upon actuation of a button on the wall station 70 as previously described. Also connected to the controller 104 is a motor 118 for driving the garage door in a manner well known in the art. The present invention contemplates use of a wall station or remote transmitter 72 that employs a plurality of transmitter actuation buttons 120*a-d* and which also provides a transmitter port connector 122 that is mateable with a connector in the transmitter port 112. Although the primary purpose of the invention is for the learning of a remote or portable transmitter, the concepts herein are equally applicable to the learning of a wall station transmitter. Accordingly, the features associated with the portable transmitter —memory, emitters, etc. —may also be provided by the wall station transmitter. In any event, when the transmitter 72 is inserted into the port 112 an electrical connection is made between the circuitry contained within the transmitter 72 and the controller 104. The transmitter 72 further includes a transmitter controller 123 which carries the necessary hardware, software and memory devices for implementing the routines for emitting a transmitter code and, when necessary, generating a new transmitter code. In particular, the transmitter controller 123 includes a temporary memory RAM and also provides a permanent memory device 126 such as an EEPROM device. It will be appreciated that the permanent memory may store a pre-programmed transmitter code or may be provided without a transmitter code. Also connected to the transmitter controller 123 is a radio frequency emitter 124 and an infrared emitter 125.

The operator may also be configured so that it is operative with a binary key designated generally by the numeral 130. As represented in FIG. 2, the key 130 is provided with a binary code that may be embedded in a magnetic strip, provided by an optical character recognition indicia or by a hologram or other medium capable of carrying a code that is readable in a format that can be submitted to the operator controller 104. Accordingly, the key 130 is receivable in a key port 138 provided by the operator housing. Each key 130 is associated with a wall station 70 or transmitter 72 when they are shipped from a central distribution point or factory. The key 130 is specifically associated with a code stored in the permanent memory 126 of the transmitter 72 or in the permanent memory of the wall station. Therefore, when a transmitter 72 with a binary key associated therewith is to be associated with a particular operator, the user inserts the key 130 into the key port 138 whereupon the operator reads the code and then accepts any transmissions from that specific remote transmitter 72.

Figure 3:
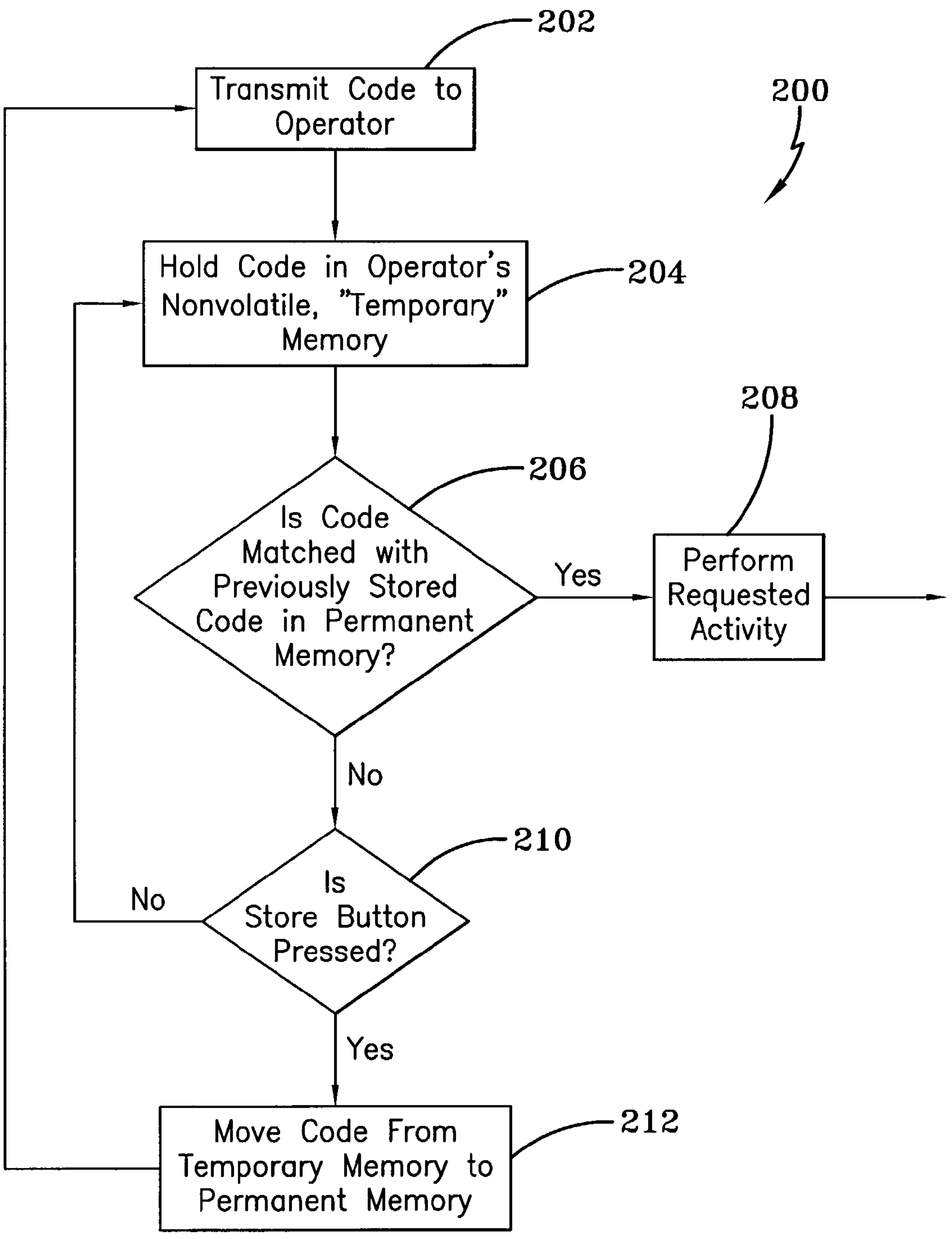
FIG. 3 is an operational flow chart employed by the operator of the present invention for learning a transmitted code held in a temporary memory.

Referring now to FIG. 3, a method for learning a remote transmitter code is designated generally by the numeral 200. A first step of this process, at step 202, is for a technician or user to actuate the button 120 so as to emit a radio frequency signal that is received by the receiver 110. The controller 104 converts the RF signal into a useable format and at step 204 holds the code in the non-volatile temporary memory device 106. At step 206, the controller 104 checks the code held in the temporary memory 106 with previously stored codes in the permanent memory device 108. If a match is determined by the controller 104 then the operator 102 performs the requested function at step 208. Typically, this function would be the opening and closing of the garage door, turning on or off lights associated with the garage door or other features. If, however, at step 206 it is determined that the code held in the temporary memory device 106 does not match any previously stored code, the controller 104, at step 210 awaits for actuation of the store button 114. Once the store button is pressed at step 212, the code is shifted from the temporary memory 106 into the permanent memory 108. If the store button is not pressed at step 210, then the process returns to step 204. If desired, a timer could be placed on the code held in temporary memory such that if the store button is not pressed in a predetermined period of time, the code is deleted from the temporary memory. By using the foregoing methodology a new transmitter code may be easily learned, and the methodology allows for the last valid data transmission to be stored. This in contrast to previous learning methods which require transmission to occur within a set period of time after a learn button is depressed. Accordingly, the learning process is much easier to implement than previously known learning methodologies.

Figure 4:
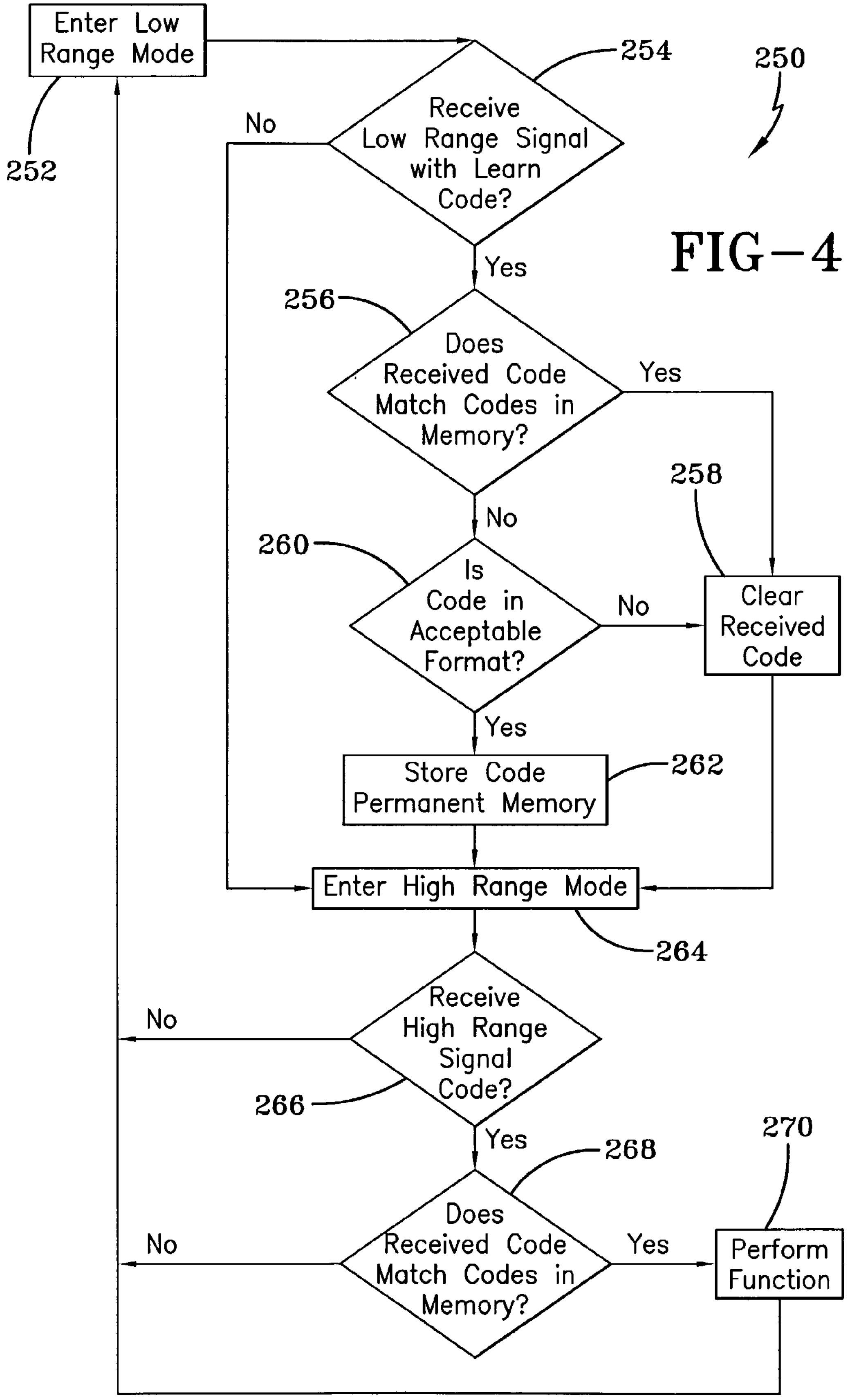
FIG. 4 is an operational flow chart employed by the operator of the present invention for learning a new transmitter code wherein the operator alternates between a low range mode and a high range mode, wherein the low range mode allows for learning of a new transmitter code and wherein the high range mode allows for actuation of the operator utilizing the code learned during the low range mode.

Referring now to FIG. 4 an operational methodology for learning a transmitter code is designated generally by the numeral 250. At a first step 252, the controller 104 enters a "low range" mode. This low range mode of the controller allows for the receiver 110 to receive radio frequency signals that are within 0 to about 4 feet of the receiver. If a low range signal with a learn code is not received at step 254, the process continues on at step 264. However, if at step 254 the controller 104 detects a low range signal then at step 256, the controller 104 determines whether the received learn code matches a code in the permanent memory device 108. If a match is detected, the controller, at step 258, clears the received code from the temporary memory device 106. If at step 256 the received learn code does not match any codes in the permanent memory 108, the controller then determines whether the code is an acceptable format at step 260. If the learn code is not acceptable, the controller continues on to step 258 whereupon that particular learn code is cleared from memory, and the process then continues to step 264.

If at step 260 the code is determined to be in an acceptable format, the process continues to step 262 where the code is stored in the permanent memory device 108. Upon completion of the aforementioned steps the process continues on at step 264 wherein the controller 104 enters a "high range" mode. In this mode, the receiver 110 is able to accept action codes generated by a transmitter located anywhere from 0 to about 400 feet. Those skilled in the art will appreciate that the distances specified for the low range mode and the high range mode can be adjusted by selecting compatible receivers and transmitting radio frequency devices. Accordingly, the low range and high range could be at different distances than those indicated, however, it is believed that the distances provided are the preferred for learning a new transmitter code. In any event, at step 266, the processor checks to see whether a high range signal action code has been received. If a high range signal action code has not been received then the process returns to step 252. If at step 266 a high range signal action code is received, then the process continues on to step 268 to determine whether the received action code, which is placed in the temporary memory device 106, matches any of the learn codes stored in the permanent memory device 108. If there is a match, then at step 270 the operator 104 performs the programmed function. If at step 268 the action code does not match any transmitter code stored in memory, then the process returns to step 252 to re-enter the low range mode. It will be appreciated that by alternating the low range mode and high range mode, the controller is able to learn a new code without a user or mechanic physically placing the controller in a "learn mode." As such, an individual may stand close to the operator to emit a signal for learning a new transmitter for use therewith. Once the new code is learned, the transmitter may be used at any distance recognizable by the controller within its range. Therefore, the programming of a new transmitter is quite easily accomplished without physically pressing any other buttons or codes other than provided by the transmitter to be learned.

Figure 5:
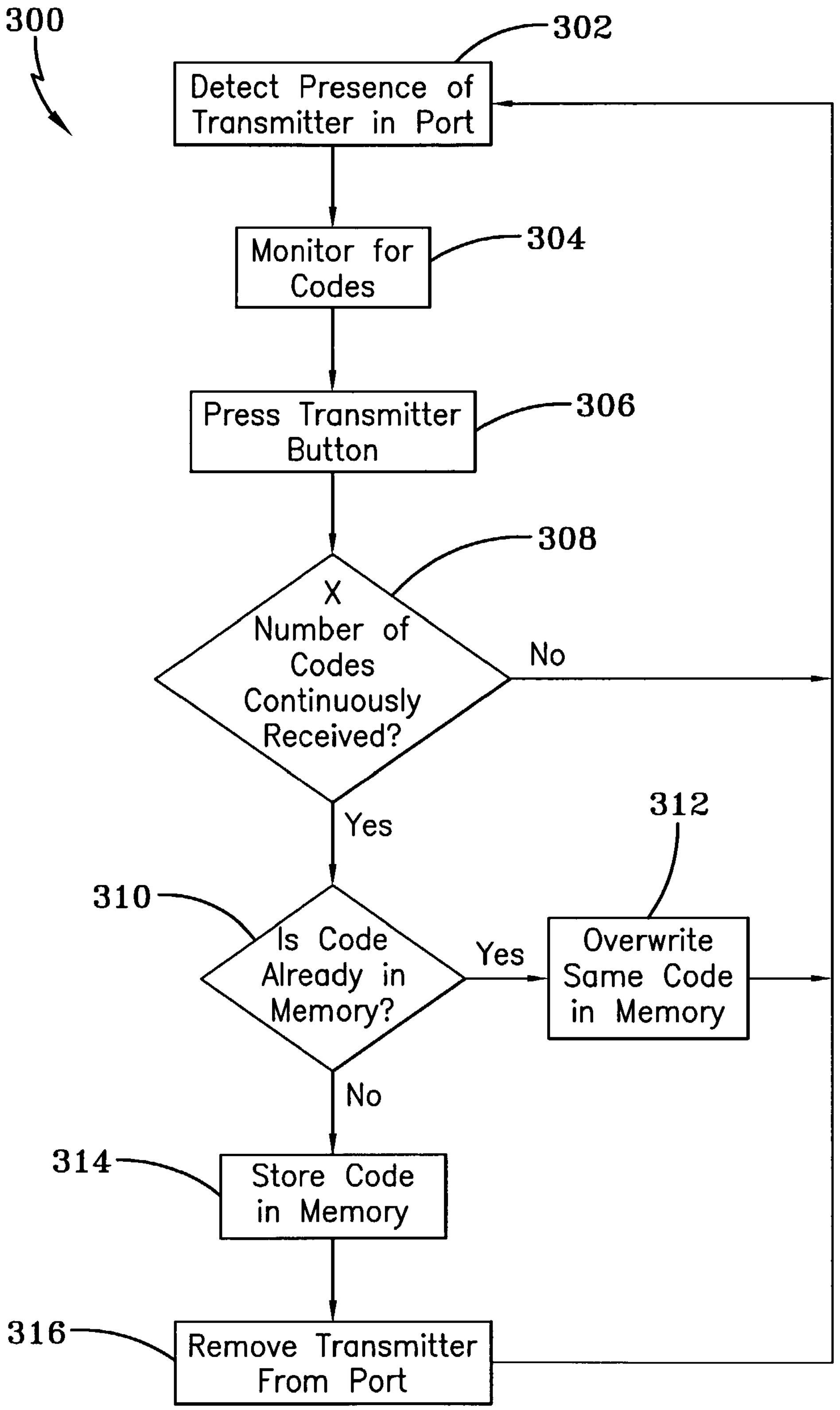
FIG. 5 is an operational flow chart employed by the operator of the present invention for learning a new transmitter code wherein the transmitter is electrically connected to the operator and the new code is sent to the operator by the transmitter.

Referring now to FIG. 5, a methodology for learning a transmitter code that is used to move a garage door between positions is designated generally by the numeral 300. In this embodiment, a first step 302 requires detection of the transmitter 72 in the connector port 112. The transmitter 72 is provided with a connector 122 that is electrically connectable to the controller 104 by virtue of a mating connector in the port 112. Accordingly, at step 304 the controller 104 monitors for transmitted codes on a continuous basis. At step 306, the user or the mechanic depresses one of the buttons 120*a-d* to be learned which, in turn, transmits the code to be learned. At step 308, the processor requires that the number of codes continuously received equal a predetermined number x which in the preferred embodiment is five repeated cycles of the signal. If at step 308 the number of codes to be continuously received is not obtained, the procedural flow returns to step 302. If, however, at step 308 it is determined that the proper number of codes continuously received is met, the process continues to step 310 wherein the code is stored in the temporary memory device 106 and it is compared by the controller 104 to all codes in the permanent memory 108. If it is determined that the code is already in the permanent memory, then the controller 104 overides that particular code with the received code at step 312. If, however at step 314, the code is not already in permanent memory, then the controller 104 writes the new code into a permanent memory location and the new code is learned by the operator. At step 316, the user removes the transmitter from the port 112. Accordingly, later actuation of the selected button 120*a-d* is received by the operator and the designated function is performed. Those skilled in the art will appreciate that this embodiment allows for a direct transfer of coded information contained within the transmitter 72 directly to the controller 104. This method avoids any signal interruptions that may occur by utilizing the wireless coded signals generated by the transmitter 72. This ensures that the proper code is learned by the operator system.

Figure 6:
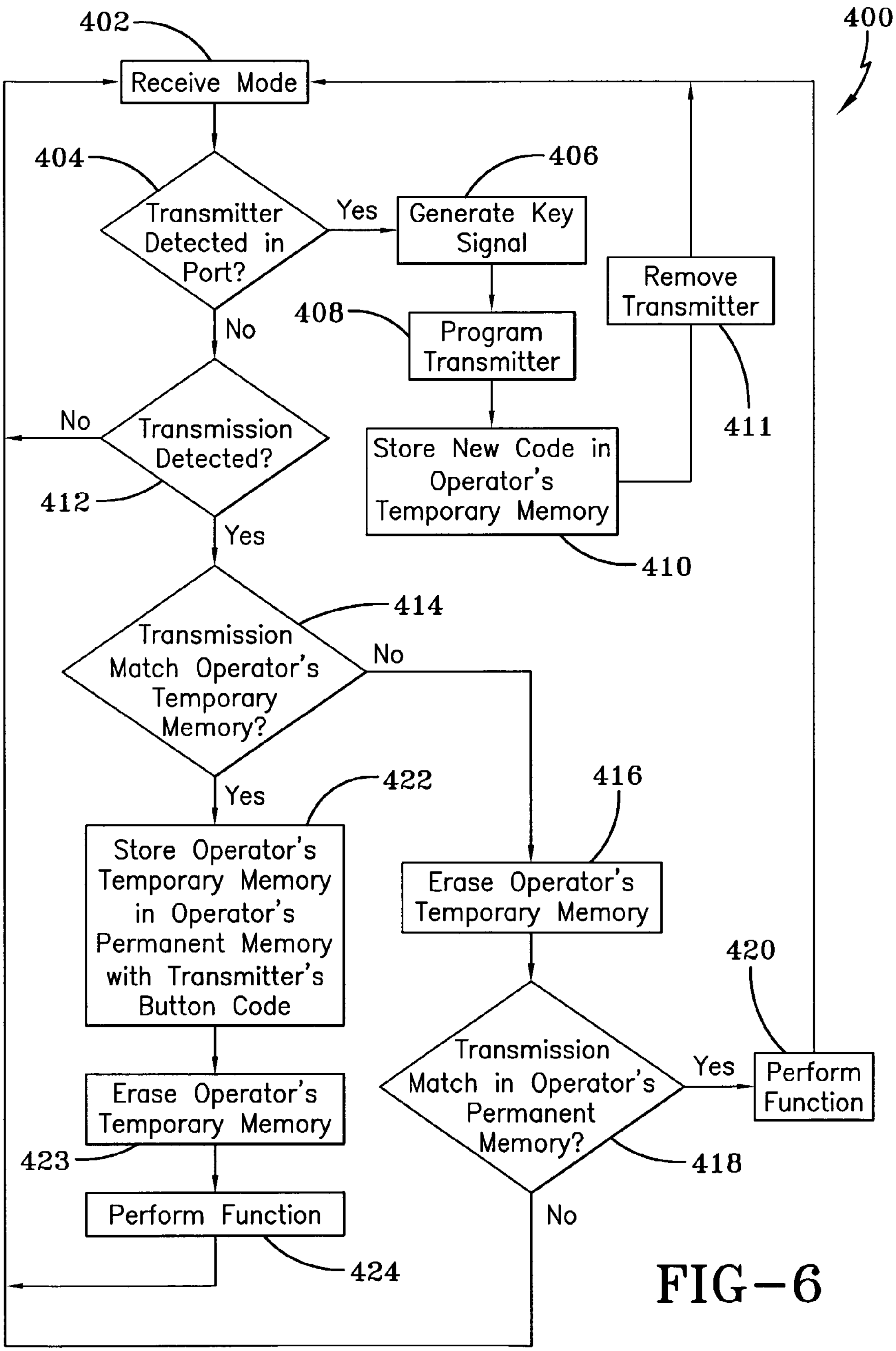
FIG. 6 is an operational flow chart employed by the operator of the present invention for learning a new transmitter code wherein the transmitter is electrically connected to the operator and the new code is sent to the transmitter by the operator.

Referring now to FIG. 6, a methodology for learning a transmitter code that is used to move a garage door between positions is designated generally by the numeral 400. In this embodiment, a first step sets forth that the operator controller 104 by virtue of normal software flow is placed in a receive mode. Next, at step 404, the operator controller determines whether the transmitter 72 is detected in the port 112. It will be appreciated that in this particular embodiment the permanent memory 126 of the transmitter is not provided with a code specifically associated with that transmitter. In other words, the transmitter 72 is shipped without a transmitter code. As such, when the transmitter is shipped from the factory it is incapable of commanding an operator for actuating movement of a garage door until the following steps are taken. Once the transmitter 72 is inserted into the port 112 an electrical connection is made via the connector 122 between the operator controller 104 and the transmitter controller 123. Upon detection of this event, the operator controller 104 generates a key signal at step 406. This key signal is electrically communicated to the transmitter controller 123 at step 408 and a code is stored in the transmitter's memory 126. At step 410 the code is stored into the temporary memory of the operator controller 104. At step 411, the user removes the transmitter and the operational flow returns to step 402.

At step 404, if the transmitter is not detected in the port, the process proceeds to step 412. The operator controller 104 then awaits actuation of any one of the buttons 120*a-d* from the newly programmed transmitter. If no transmission is detected, the flow returns to step 402. Once a transmission is detected at step 412, the flow proceeds to step 414 and the operator controller 104 determines whether the transmission of the code from the transmitter controller 123 matches the code in the temporary memory. If such an event is not detected at step 414, then at step 416 the temporary memory of the operator controller 104 is erased. If the transmission of the code from the controller 123 matches the codes stored in the permanent memory 108, at step 418, then the-operator controller 104 will perform the specified functions at step 420. If the transmission, at step 418, does not match one of the codes in the operator controller's permanent memory, then the process returns to step 402.

Returning to step 414, if the code in the transmission of the transmitter 72 matches the code in temporary memory, as determined by the operator controller 104, the temporary memory is stored in the permanent memory along with the appropriate button code which is specifically associated with button 120*a, b, c*, or *d* at step 422. Next, at step 423, the operator's temporary memory is erased. Finally, at step 424 the specified function is performed and then the operational flow returns to the receive mode 402. This embodiment allows for the sale and distribution of transmitters that do not have a pre-programmed or factory programmed code installed in the transmitter controller. Programming of this device is accomplished by inserting the device directly to the operator controller such that no inadvertent RF transmission will interfere with the learning of the transmitter controller. Moreover, the transmitter code does not need to be pre-programmed at the factory.

Figure 7:
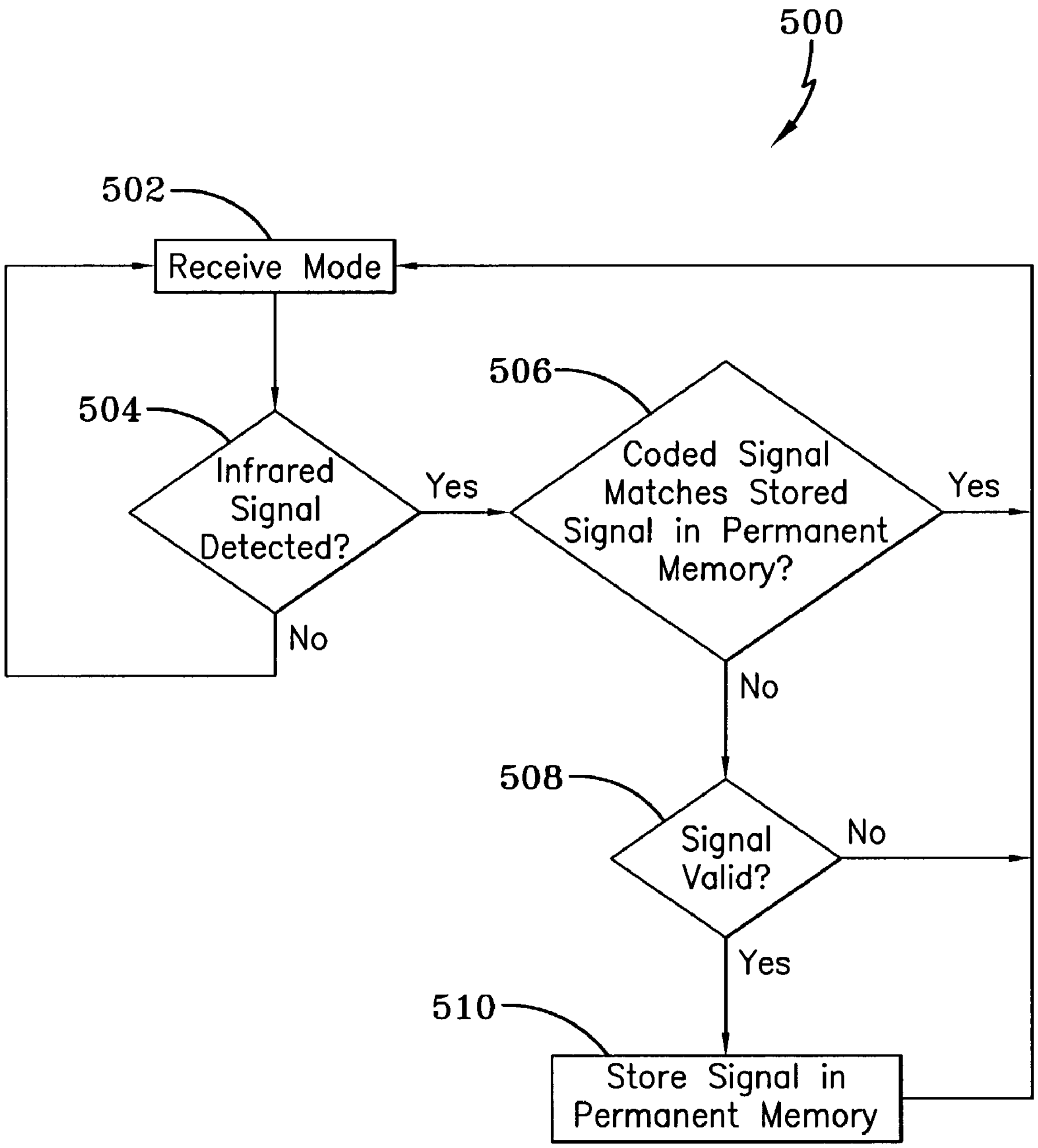
FIG. 7 is an operational flow chart employed by the operator of the present invention for learning a transmitter code wherein the transmitter emits an infrared signal that is validated and then stored in the permanent memory of the operator.

Referring now to FIG. 7, a methodology for learning a transmitter that is used to move a garage door between positions is designated generally by the numeral 500. In this embodiment, the operator controller 104 by virtue of normal software flow is in a receive mode and is awaiting instructions. In this particular embodiment, the infrared receiver 134 is utilized. It will be appreciated that in this embodiment, the infrared receiver is a low range, narrow angle infrared port which is shielded by a cap 136. The cap 136 limits the ability of the receiver to receive distant infrared signals such as through a door attached to the garage or through window panes in the garage door itself. As such, the infrared emitter 125 associated with the remote transmitter must be in close proximity to the infrared receiver 134 when practicing the methodology disclosed in FIG. 7. In this embodiment actuation of the buttons 120*a-d* generate both a radio frequency signal and an infrared signal. The infrared signal is used to learn a new transmitter to the operator at a very close distance. The radio frequency signal is used to initiate the normal operating functions of the operator.

Initially, at step 502 the operator controller 104 enters in the receive mode. At step 504 the operator controller continuously monitors for an infrared signal generated by the emitter 125. If a signal is not detected the process returns to step 502. If an infrared signal is detected at step 504 the process proceeds to step 506 to determine whether the coded signal emitted from the emitter 125 matches a code stored in the permanent memory 109. If the code matches, then the process returns to step 502. However, if the code does not match at step 506 the operator controller 104 determines whether the signal is valid at step 508. If the signal is not valid, then the process once again returns to step 502. If the signal, at step 508, is determined to be valid then the process proceeds to step 510 and the signal emitted from the transmitter 73 is stored in the permanent memory 108 associated with the operator controller 104.

The foregoing method is advantageous in that only a single button needs to be actuated for learning a new transmitter code and that this can only be done when the remote transmitter is in very close proximity to the operator. Accordingly, extraneous signals cannot interfere with the transmission nor can undesirable signals be utilized to learn a new transmitter for association with the operator.

Figure 8:
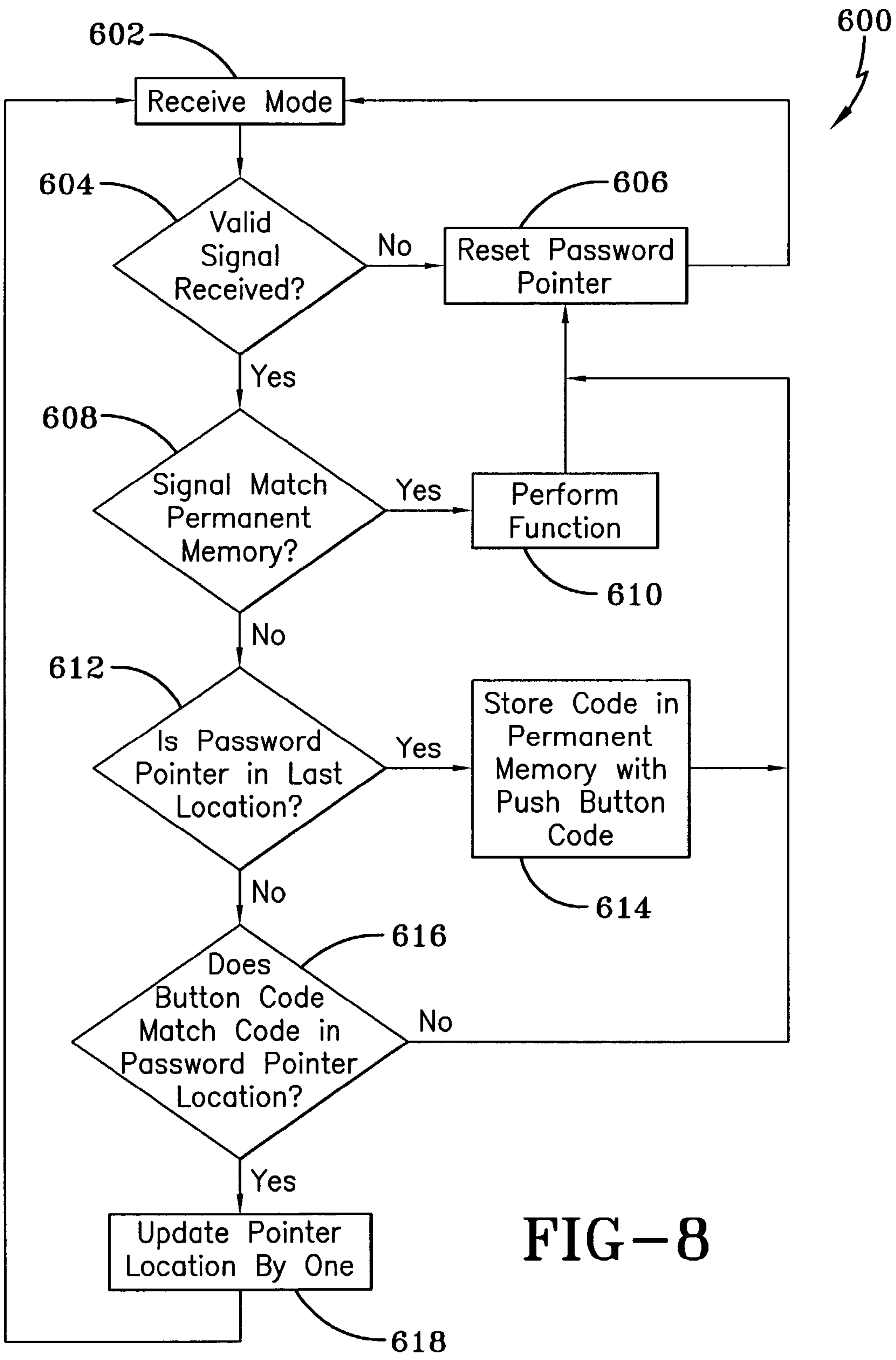
FIG. 8 is an operational flow chart employed by the operator of the present invention for learning a transmitter code wherein a specific password is entered by the user of the transmitter so as to enable that transmitter to be used with the specific operator.

Referring now to FIG. 8, a methodology for learning a transmitter code that is used to move a garage door between positions is designated generally by the numeral 600. In this embodiment, a first step 602, by virtue of normal software flow, places the operator controller 104 in a receive mode to await the next actuation of a transmitter or wall station signal. In this particular methodology a predetermined password is associated with the operator controller 104 and in fact stored in permanent memory 109. This password is readily available to the owner of the operator by the manufacturer placing the password on the operator housing or with the directions shipped with the operating housing. Accordingly, the operator controller 104 is awaiting receipt, at step 604, of a valid signal associated with the password. This password signal can be generated by the transmitter 72 by actuating any of the buttons 120*a-d* or the buttons on the wall station in a predetermined sequence that is equivalent to the password associated with the operator controller 104. For example, a proper sequence or password may be actuation of buttons 120*c*, 120*b*, and 120*a*, or C-B-A for purposes of this example. If the first segment of password is not received or the first segment does not match —in this case a "C" is not received —at step 604, the process at step 606 resets a password pointer that is provided in the operator controller's temporary memory 104. If, however, at step 604 a valid signal —button 120*c* —is received by the operator controller 104, the process continues to step 608 to determine whether the signal matches the transmitter code stored in the permanent memory 109. If so, the operator controller 104 performs the specified function at step 610 and then clears the password pointer at step 606 whereupon the process is returned to step 602. If at step 608 the signal does not match the transmitter code stored in permanent memory then the process continues to step 612 to determine whether the password pointer is in the last location. In other words, is the pointer located or comparing the last expected input —in the present example the third character A —or are additional buttons expected to be actuated. If the pointer is in the last location, then the process at step 614 stores the transmitter code in permanent memory 109 and the process returns to step 606 and then step 602.

If, however, at step 612 it is determined that the password pointer is not in the last location then, at step 616, the operator controller determines whether the button code pressed matches the button code expected for that location of the password pointer. If not, the process resets the password pointer at step 606 and the operator controller is returned to the receive mode 602. If however, the button code pressed does match the password pointer then, at step 618, the pointer is updated by one and the processor returns to the receive mode 602. Accordingly, with this process a certain sequence of buttons must be entered in the predetermined fashion so that the pointer is continually updated until it is in the last location whereupon if the entire sequence entered matches the sequence in the password pointer locations then the code is stored in the permanent memory. Once the code is stored in permanent memory, all functions available to the transmitter are operational. This embodiment is advantageous inasmuch as it is difficult to steal the codes by use of a hidden transceiver device which may be later used to open or close the garage door in an unwanted fashion. It is believed that such a methodology would be advantageous in large warehouses wherein numerous garage doors are located so as to be able to distinguish and easily learn a transmitter with a particular operator.

Figure 9:
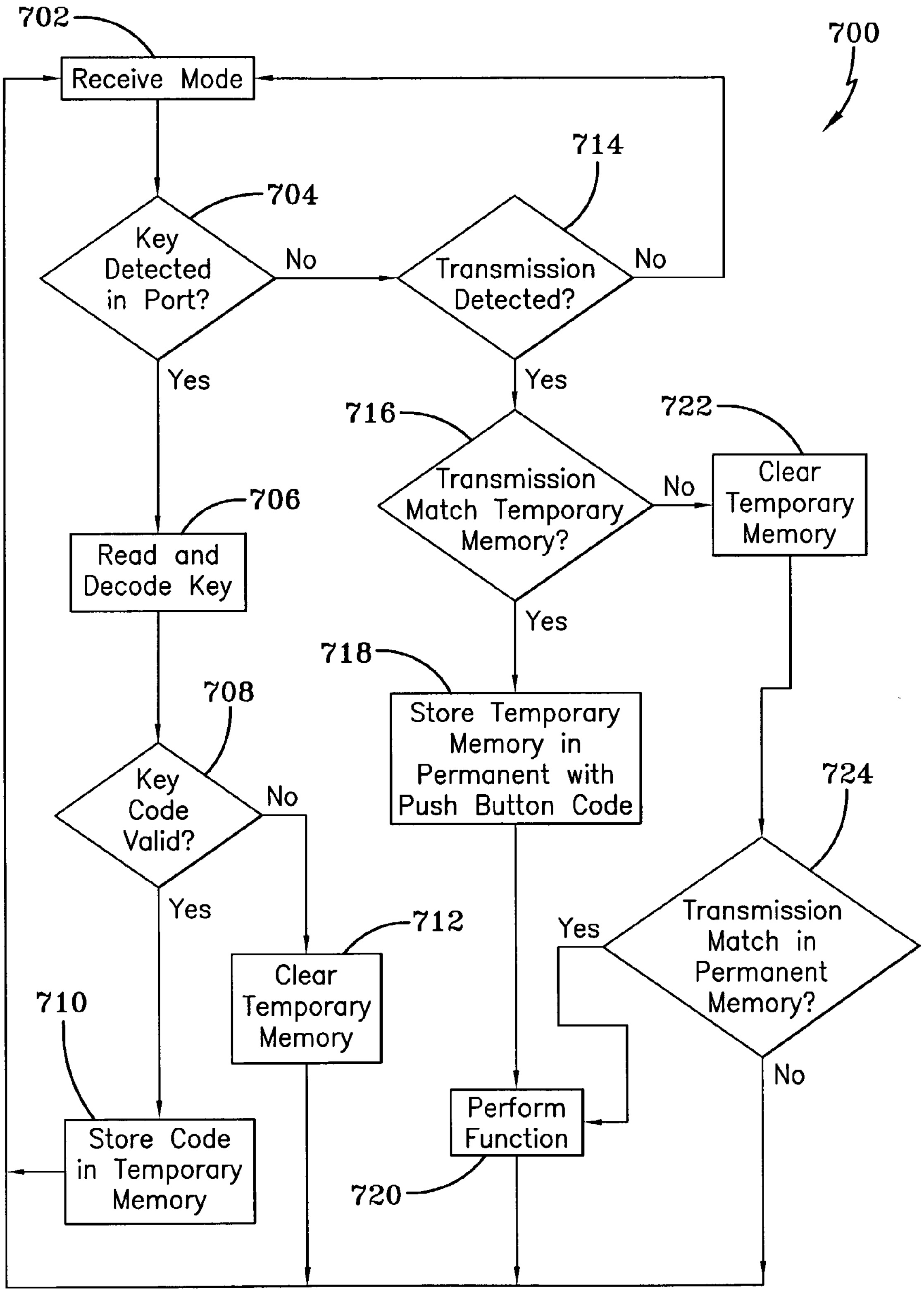
FIG. 9 is an operational flow chart employed by the operator of the present invention for learning a transmitter code by inserting a key into the operator to learn a transmitter code that is associated with the key.

Referring now to FIG. 9, a methodology for learning a transmitter code that is used to move a garage door between positions is designated generally by the numeral 700. In this embodiment, the key 130 is utilized in conjunction with the key port 138. Initially, the operator, by virtue of normal software flow, enters a receive mode at step 702. The user will then insert the key 130 into the key port 138 and at step 704 the operator determines whether the key is in fact placed in the port. If the key 130 is detected, the process proceeds to step 706 where the code contained on the key 130 is read and is decoded and transmitted to the operator controller 104. At step 708, the operator controller determines whether they key code is valid and if so, the key code is stored in the temporary memory device 106 at step 710.

If at step 708 the key code is determined not to be valid the temporary memory is cleared at step 712. At this time, the key 130 may be removed from the key port 138 although it may remain without jeopardizing the transmission function of the operator. In any event, at step 704 if the key is not detected in the port, the process proceeds to step 714.

At step 714, the controller determines whether a transmission from a remote transmitter has been detected or not. If not, the process returns to step 702. If, however, at step 714 a transmission is detected, the process proceeds to step 716 to determine whether the code in the transmission matches the key code stored in the temporary memory. If the temporary memory does match the key code then at step 718 the temporary memory is stored in the permanent memory with the push button code associated with the particular transmitter of the most recent transmission. At step 720 the predetermined function associated with that button code is performed. And after completion of the function the process returns to step 702.

If at step 716 the transmission from the remote transmitter does not match the temporary memory, the temporary memory is cleared at step 722. Next, at step 724, the transmission is compared to the codes stored in the permanent memory and if a match is present then the process proceeds to step 720 where the predetermined function is performed. However, if the transmission does not match any code in permanent memory the process simply returns to the receive mode at 702.

The foregoing method is advantageous in that a key device is employed to learn a transmitter to a particular operator and that key device may be removed or safe storage in a separate location. This allows for accurate programming of a particular transmitter without the possibility of extraneous signals interfering with the learning ofthe transmitter. From the foregoing methods and the operator's interactions with the other components, it will be appreciated that this invention has several advantages. The aforementioned methodologies allow for learning remote transmitter codes in such a way that is both accurate and less time consuming for the setup mechanic or user. In particular, the methods allow for simple single button depressions for the learning of new codes in contrast to previous methodologies that required at least depression of two different buttons or the possibility that the transmissions could be interrupted during the learning process and as such the process must be repeated until the code is learned.

Thus, it should be evident that the methodologies for learning new transmitter codes for a motorized garage door operator disclosed herein carries out the various objects of the present invention set forth above and otherwise constitutes an advantageous contribution to the art. As will be apparent to those persons skilled in the art, modifications can be made to the preferred embodiments disclosed herein without departing from the spirit of the invention. Therefore, the scope of the invention herein described shall be limited solely by the scope of the attached claims.

What is claimed is:

1. An operator for a movable barrier comprising:

a motor for moving the movable barrier between travel limit positions;

an operator that controls operation of said motor, said operator capable of receiving a coded signal for energizing said motor, said operator having a memory device;

a housing for carrying said operator, said housing having a port connector connected to said memory device;

at least one remote transmitter electrically connectable to and receivable in said port connector, said remote transmitter having a button that when actuated transmits said coded signal to said operator for energizing said motor;

wherein if said remote transmitter is electrically connected to and received in said port connector and said button is actuated, said coded signal sent from said transmitter is stored in said memory device of said operator, enabling said remote transmitter to initiate functions provided by said operator, and wherein actuation of said button when said remote transmitter is not electrically connected to said port connector transmits said coded signal that energizes said motor if said coded signal matches a previously stored code in said memory device.

2. The operator according to claim 1, wherein if said coded signal is already stored in said memory device said coded signal overwrites said previously stored code.

3. A method for teaching a code to an operator that enables actuation of a motor to move a barrier between limit positions, wherein the operator is carried by a housing, the method comprising:

providing a port connector in the housing that carries the operator, wherein said port connector is connected to the operator;

connecting a transmitter, which has a button, to said port connector; and actuating said button provided by said transmitter to store a coded signal into a memory device maintained by said operator, so as to enable said transmitter to initiate functions at said operator.

4. The method according to claim 3, further comprising:

counting the number of times said coded signal is received and not storing said coded signal until the number of times counted reaches a predetermined number.

5. The method according to claim 4, further comprising:

checking said memory device to determine whether said coded signal is already stored therein, and if not, store said coded signal in said memory device.

6. The method according to claim 4, further comprising:

checking said memory device to determine whether said coded signal is already stored therein, and if so, writing said coded signal over said same coded signal in said memory device.

7. The method according to claim 4, further comprising:

disconnecting said remote transmitter from said port connector; and actuating said button to energize said motor.

8. An operator for a movable barrier, comprising:

a motor for moving the movable barrier between travel limit positions;

a housing for the operator, said housing having a port connector;

an operator carried by said housing, said operator controlling operation of said motor upon receipt of a code, said operator electrically connected to said port connector, said operator having a memory device with a key code;

at least one remote transmitter electrically connectable to and receivable in said port connector, said remote transmitter having a transmitter controller with a transmitter memory, and a button that when actuated transmits said code;

wherein if said remote transmitter is electrically connected to and received in said port connector, said operator generates a new code based upon said key code and transfers said new code to said transmitter memory such that when said remote transmitter is removed from said connector port and said button is actuated, said new code is transmitted to said operator which initiates movement of said motor.

9. The operator according to claim 8, wherein said transmitter memory is initially blank prior to connection of said remote transmitter to said port connector.

10. An operator for a movable barrier, comprising:

a motor for moving the movable barrier between travel limit positions;

a housing, said housing having a port connector;

an operator carried by said housing, said operator controlling operation of said motor upon receipt of a code, said operator electrically connected to said port connector, said operator having a memory device with a key code;

at least one remote transmitter electrically connectable to said port connector, said remote transmitter having a transmitter controller with a transmitter memory, and a button that when actuated transmits said code;

wherein if said remote transmitter is electrically connected to said port connector, said operator generates a new code based upon said key code and transfers said new code to said transmitter memory such that when said remote transmitter is removed from said connector port and said button is actuated, said new code is transmitted to said operator which initiates movement of said motor, wherein said transmitter memory has stored therein said code, and wherein said new code is stored in a temporary memory device of said operator, and wherein after said transmitter is removed and said button is actuated, said new code is transterred from said operator's temporary memory device to a permanent memory device of said operator along with a button code.

11. A method for teaching a code to a transmitter that enables an operator to actuate a motor to move a barrier between positions, wherein the operator is carried by a housing, the method comprising:

providing the housing with a port connector;

receiving a remote transmitter, which has a memory device, in said port connector;

generating a new code by the operator;

storing said new code in a temporary memory device of said operator;

removing said remote transmitter from said port connector;

actuating a button on said remote transmitter to transmit said new code and a button code;

confirming said new code by said operator; and storing said new code and said button code in a permanent memory device of said operator.

12. The method according to claim 11, further comprising:

providing said memory device with no code stored therein.

13. An operator for a movable barrier, comprising:

a motor for moving the movable barrier between travel limit positions;

an operator for controlling operation of said motor, said operator capable of receiving a an infrared signal and a radio frequency signal, said operator having a memory device capable of storing a signal code; and at least one remote transmitter for emitting both said infrared and radio frequency signals, wherein both said infrared and radio frequency signals include said signal code;

wherein if said infrared signal is in a valid format, said signal code is stored in said memory device so as to learn at least one transmitter to said operator allowing said at least one transmitter to control one or more functions provided by said operator and wherein said operator compares said signal code of said radio frequency signal to said signal code stored in said memory device and initiates movement of the barrier if said compared signal codes match.

14. The operator according to claim 13, wherein said operator further comprises:

an infrared receiver partially surrounded by a cap so as to require said at least one remote transmitter to be placed in close proximity to said infrared receiver to enable receipt of said infrared signal while learning said at least one remote transmitter to said operator.

15. A method of learning a single transmitter to an operator to enable actuation of a motor to move a barrier between limit positions, comprising:

continuously monitoring for an infrared signal and a radio frequency signal generated by the single transmitter;

detecting said infrared and said radio frequency signal;

storing, without actuation of a switch, said infrared signal as a stored signal if said infrared signal does not match a previously stored signal, so as to leam the single transmitter to the operator, thus enabling the single transmitter to initiate functions maintained by said operator; and performing a specified function at the operator if said radio frequency signal matches said stored signal.

16. The method according to claim 15, further comprising:

validating said infrared signal prior to said storing step.

17. The method according to claim 16, emitting simultaneously said infrared signal and a radio frequency signal to initiate said specified function.

18. An operator for a movable barrier, comprising:

a motor for moving the movable barrier between travel limit positions;

a housing, said housing having a port connector;

an operator carried by said housing, said operator controlling operation of said motor upon receipt of a code, said operator electrically connected to said port connector, said operator having a temporary memory and a permanent memory;

at least one remote transmitter, said remote transmitter having a button that when actuated transmits a code; and a key having a code indicia associated therewith, said key receivable in said port connector;

wherein said port connector reads said code indicia when said key is received therein and stores said code in said operator's temporary memory, and wherein if said remote transmitter emits a signal with said code that matches said code indicia stored in said temporary memory, said code indicia is transferred from said temporary memory to said permanent memory.

* * * * *

UNITED STATES PATENT AND TRADEMARK OFFICE

CERTIFICATE OF CORRECTION

PATENT NO. : 7,375,612 B2 
APPLICATION NO. : 10/265833
DATED : May 20, 2008
INVENTOR(S) : James S. Murray and Yan Rodriguez It is certified that error appears in the above-identified patent and that said Letters Patent is hereby corrected as shown below:

In Column 16, line 61 (Claim 13, line 5) the words “a an” should read --an--
In Column 17, line 25 (Claim 15, line 9) the word “leam” should read --learn--.

Signed and Sealed this

Nineteenth Day of August, 2008

JON W. DUDAS
*Director of the United States Patent and Trademark Office*